(12) United States Patent
Lin

(10) Patent No.: US 8,606,025 B2
(45) Date of Patent: Dec. 10, 2013

(54) ENCODING AND DECODING IMAGES USING REFRESHED IMAGE AND RECOVERY POINT

(75) Inventor: Yongbing Lin, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 807 days.

(21) Appl. No.: 12/470,199

(22) Filed: May 21, 2009

(65) Prior Publication Data
US 2009/0226107 A1 Sep. 10, 2009

Related U.S. Application Data

(63) Continuation of application No. PCT/CN2008/071242, filed on Jun. 10, 2008.

(30) Foreign Application Priority Data

Jun. 10, 2007 (CN) .......................... 2007 1 0111688

(51) Int. Cl.
*G06K 9/36* (2006.01)
*H04N 7/12* (2006.01)

(52) U.S. Cl.
USPC ..................................... 382/236; 375/240.12

(58) Field of Classification Search
USPC ................... 382/236; 707/104.1; 375/240.12
See application file for complete search history.

(56) References Cited

U.S. PATENT DOCUMENTS

| 5,731,386 A * | 3/1998 | Thackeray et al. ........ 525/328.2 |
| 2004/0056884 A1 | 3/2004 | Eifrig et al. |
| 2004/0066854 A1 | 4/2004 | Hannuksela |
| 2004/0071354 A1 * | 4/2004 | Adachi et al. ................ 382/236 |
| 2005/0018915 A1 * | 1/2005 | Sumioka et al. .............. 382/234 |
| 2006/0120464 A1 * | 6/2006 | Hannuksela ............. 375/240.27 |
| 2006/0140271 A1 * | 6/2006 | Wedi et al. ............... 375/240.12 |
| 2007/0073779 A1 * | 3/2007 | Walker et al. .............. 707/104.1 |

(Continued)

FOREIGN PATENT DOCUMENTS

| CN | 1669321 A | 9/2005 |
| CN | 1774934 A | 5/2006 |

(Continued)

OTHER PUBLICATIONS

Written Opinion of the International Search Authority issued in corresponding patent application No. PCT/CN2008/071242, mailed Sep. 11, 2008.

Ye-Kui Wang, Nokia Research Center, "Support of Gradual Random Access Points", Chinese Audio and Video Coding Standard Working Group. AVS M1494, Dec. 2004.

Ye-Kui Wang et al., Tampere University of Technology and Nokia Corporation, "Gradual Decoder Refresh Using Isolated Regions", Joint Video Team of ISO/IEC MPEG & ITU-T VCEG. JVT-O074, 3$^{rd}$ Meeting, May 6-10, 2002.

(Continued)

*Primary Examiner* — Wenpeng Chen
(74) *Attorney, Agent, or Firm* — Brinks Gilson & Lione

(57) ABSTRACT

Encoding and decoding methods are provided to improve the coding efficiency when implementing random access. A recovery point is defined. The encoding method includes: encoding an I-frame to obtain a first reconstructed image; encoding a reference image between the I-frame and the recovery point to obtain a second reconstructed image; refreshing the second reconstructed image to obtain a first refreshed image; using at least one of the first reconstructed image and the first refreshed image as a reference image to encode the corresponding frame at the recovery point. When random access occurs at the I-frame, from the recovery point correct decoding starts at the decoder and the decoded image is consistent with the coded image at the encoder. An encoder, a decoder, and an image processing system are also provided herein.

15 Claims, 12 Drawing Sheets

(56) References Cited

U.S. PATENT DOCUMENTS

| | | | |
|---|---|---|---|
| 2007/0206673 A1* | 9/2007 | Cipolli et al. | 375/240.1 |
| 2008/0025407 A1* | 1/2008 | Winger | 375/240.25 |
| 2009/0052543 A1* | 2/2009 | Wu et al. | 375/240.24 |
| 2009/0238280 A1* | 9/2009 | Bandyopadhyay et al. | 375/240.16 |
| 2009/0285284 A1* | 11/2009 | Toma et al. | 375/240.12 |
| 2010/0202519 A1* | 8/2010 | Koo et al. | 375/240.12 |
| 2010/0272412 A1* | 10/2010 | Yahata et al. | 386/70 |

FOREIGN PATENT DOCUMENTS

| | | |
|---|---|---|
| CN | 1820494 A | 8/2006 |
| CN | 1829329 A | 9/2006 |
| CN | 1957617 A | 5/2007 |
| CN | 1964487 A | 5/2007 |
| EP | 1 589 770 A2 | 9/2004 |
| JP | 2005-260714 A | 9/2005 |

OTHER PUBLICATIONS

Ye-Kui Wang et al., Tampere University of Technology and Nokia Corporation, "Error-Robust Video Coding Using Isolated Regions", Joint Video Team of ISO/IEC MPEG & ITU-T VCEG. JVT-0073, 3$^{rd}$ Meeting, May 6-10, 2002.

"Advanced Video Coding for Generic Audiovisual Services", International Tellecommunication Union, Series H: Audiovisual and Multimedia Systems—Infrastructure of Audiovisual Services—Coding of Moving Video. H.264, Mar. 2005.

Hannuksela et al., "Isolated Regions in Video Coding", IEEE Transactions on Multimedia, vol. 6, No. 2, Apr. 2004.

Hannuksela et al., "Random Access Using Isolated Regions", Nokia Mobile Software and Tampere University of Technology, IEEE 2003.

International Search Report issued in corresponding PCT Application No. PCT/CN2008/071242; mailed Sep. 11, 2008.

* cited by examiner ised # ENCODING AND DECODING IMAGES USING REFRESHED IMAGE AND RECOVERY POINT

CROSS REFERENCE TO RELATED APPLICATIONS

This application is a continuation of International Application No. PCT/CN2008/071242, filed on Jun. 10, 2008, titled "Encoding and Decoding Method, Encoder and Decoder, and Imaging Processing System", which claims priority to Chinese Patent Application No. 200710111688.0, filed with the Chinese Patent Office on Jun. 10, 2007 and entitled "Encoding and Decoding Method, Device, and System". The contents of the above identified applications are hereby incorporated by reference in their entirety.

FIELD OF THE INVENTION

The present disclosure relates to image processing, and in particular, to an encoding and decoding technology.

BACKGROUND

Video image compression coding is a booming field of research currently. In the past two decades, the video compression coding technology has been developing continuously, and new video compression coding standards are emerging. The Motion Picture Experts Group (MPEG)-1 standard formulated by the MPEG organization in 1991 is oriented to the Video Compact Disk (VCD) applications, and achieves a great success in the Chinese market. The MPEG-2 standard jointly formulated by the MPEG and the ITU in 1994 is oriented to the applications of the digital television broadcast and Digital Video Disks (DVDs). The MPEG-2 standard is a video compression standard that has been the most widely applied, the most mature, and the most influential in the digital video broadcast and laser disk field so far. Afterward, the MPEG launches the MPEG-4, which is an object-oriented new-generation video compression coding standard; the ITU launches the H.263 standard oriented to video conferences and video communication, and the subsequent H.263+ and H.263++. Currently, the latest video compression coding standards include the H.264/AVC (Advanced Video Coding) standard jointly formulated by the ITU and the MPEG, and the VC-1 (Video Codec 1) standard formulated by Microsoft. The H.264/AVC standard was promulgated by the ISO/IEC/ITU standardization organization as an international standard in March 2005, and the VC-1 standard was promulgated by the SMPTE standardization organization in April 2006. The trends of the video compression coding technology are: higher coding compression efficiency, better network compatibility, better user experience, and a wider application field.

In order to obtain high coding compression efficiency, the current video compression coding technologies strive to remove the redundant information within an image and between images, including redundancy of time, space, statistics and human eye vision. For example, in the H.264 standard, the coding efficiency is improved through multiple technologies, including fully reversible integer conversion, multi-reference image prediction, multi-mode intra-frame prediction, Variable Block Size Motion Compensation (VB-SMC), ¼ pixel interpolation, deblocking loop filter, efficient entropy coding, and so on.

The multi-reference image prediction technologies relate to the intra-frame coded image, inter-frame coded image, and Group of Picture (GOP). The intra-frame coded image is coded by the image itself, without using other images as reference. The intra-frame coded image may be coded through an intra-frame prediction technology. For example, the I-frame is an intra-frame coded image. The inter-frame coded image is coded through an inter-frame prediction technology, and predictive coding needs to be performed for the image according to a reference image. The inter-frame coded image includes two types: forward predictive coded image, and bidirectional predictive coded image. A bidirectional predictive coded image is an image that performs inter-frame predictive coding in both the forward direction and the backward direction. There may be one or more reference images in the forward direction or backward direction. For example, the P-frame is a forward predictive coded image, and the B-frame is a bidirectional predictive coded image. A GOP is a group of coded images, and is composed of one intra-frame coded image and multiple inter-frame coded images subsequent to this intra-frame coded image. A GOP header may be used to assist random access and edit.

A reference image is an image used by an inter-frame coded image as a reference. An inter-frame coded image requires a reference image before performing inter-frame predictive coding. Likewise, a reference image is also required for decoding the inter-frame coded image at the decoder. A reference image is also called a key image. A reference image may be an intra-frame coded image such as I-frame, or an inter-frame coded image, such as P-frame, but cannot be a B-frame.

A non-reference image is an image not used by any other image as a reference. In some applications, the non-reference image may be discarded, and may be applied to support scalability on the time axis. Here, the non-reference image refers to the bidirectional predictive coded image, namely, B-frame.

In the case that the multi-reference image prediction technology is applied, random access may lead to loss of the reference image.

Random access refers to a capability of decoding a bit stream and recovering the decoded image, where the decoding starts from a point other than the start point of the bit stream. Random access may includes two types: instant random access, where correct decoding of the bit stream starts from the cut-in point of the bit stream; and gradual random access, where a time of period is required between the cut-in point of the bit stream and the point of bit stream that can be correctly decoded. Random access is directly related to user experience. The situations that require random access may include: program channel shift, bit stream switching, editing and splicing, random positioning of program playback, fast-forward, fast-backward, etc. Different services impose different requirements on the random access performance. For example, for a broadcast service, the Digital Video Broadcasting (DVB) standard stipulates that a random access cut-in point needs to occur every other 0.5 s; for video communication, videoconference, and Pay Per View (PPV), lower requirements are imposed on the random access performance. In order to support random access, the video bit stream requires a certain amount of redundant information. Therefore, a contradictory relation exists between the performance of random access and the coding efficiency. Video coding standards need to achieve a tradeoff between the performance and the efficiency.

In the case of multi-reference images, the P-frame may bypass the I-frame to use the image before the I-frame as reference image. However, if the image before the I-frame is erroneous, the I-frame is unable to completely prevent error spreading. Moreover, when random access occurs on the I-frame, the image before the access point is unavailable but the inter-frame coded image needs to be decoded by using the reference image before the access point. Therefore, the decoding of the image after the cut-in point is impossible.

The loss of the reference image may occur for other reasons, for example, edit (cut or splicing) of the bit stream. Unavailability of all reference images before the cut-in point or change of the image content may make it impossible to decode subsequent images or lead to decoding errors. Further, the reference image may be lost during the transmission process. For instance, when bit stream is transmitted on a channel with errors, abrupt errors or accumulated errors may make it impossible to decode the image correctly.

The H.264 standard puts forward two solutions to prevention of error spreading caused by loss of the reference image.

I. An Instantaneous Decoder Refresh (IDR) image is introduced. The IDR image is a new image type, and is an intra-frame coded image. The images after the IDR image do not use the images before the IDR image as reference. The IDR image and all images after it can be decoded correctly. The first image in a video sequence should be an IDR image. The IDR image may serve as a random access cut-in point. However, in the process of implementing the present disclosure, the inventor finds at least the following defects in the foregoing method:

Because the images after the IDR image do not use the images before the IDR image as reference, so the images after the IDR image at the random access cut-in point are unable to make full use of the multi-reference image technology. Therefore, the coding efficiency may be reduced.

II. The Gradual Decoding Refresh (GDR) technology based on an isolated area is introduced. The intra-frame macro block refreshing technology based on an isolated area is applied, and random access can be achieved in the case of multi-reference images. The random access cut-in point may be the P-frame or B-frame. However, in the process of implementing the present disclosure, the inventor finds at least the following defects in the foregoing method:

The use of the isolated area and the intra-frame macro block is restricted, and many restrictions are imposed on the coding tools such as loop filter, intra-frame or inter-frame prediction, and even scanning. Consequently, the coding efficiency is reduced. Compared with the IDR technology, the foregoing method leads to loss of more coding gain.

The Audio Video coding Standard (AVS) also adopts the multi-reference image technology, and allows using two frames as reference frames in the forward direction. Moreover, the reference features of subsequent images are restricted through a sequence header. That is, the prediction reference feature of the first P-frame after the first I-frame is restricted in order to implement random access, wherein the I-frame is after the sequence header. However, in the process of implementing the present disclosure, the inventor finds at least the following defects in the foregoing method:

Because the prediction reference feature of the first P-frame after the I-frame after the sequence header is restricted, the coding efficiency is reduced.

It can be seen from the above description that, the coding efficiency is low when random access is implemented through technologies in the prior art.

SUMMARY

An encoding and decoding method, an encoder, a decoder, and a system are provided in embodiments of the present disclosure to improve the coding efficiency when implementing random access.

An encoding method is provided in an embodiment of the present disclosure. The method includes the following steps: encoding an I-frame image to obtain a first reconstructed image; encoding an image between the I-frame image and a recovery point to obtain a second reconstructed image; refreshing the second reconstructed image to obtain a first refreshed image; and encoding the corresponding image at the recovery point by using at least one of the first reconstructed image and the first refreshed image as a reference image.

A decoding method is provided in an embodiment of the present disclosure. The method includes the following steps: decoding an I-frame image to obtain a first decoded image; decoding an image between the I-frame image and a recovery point to obtain a second decoded image; refreshing the second decoded image to obtain a second refreshed image; and decoding the corresponding image at the recovery point by using at least one of the first decoded image and the second refreshed image as a reference image.

An encoder is provided in an embodiment of the present disclosure. The encoder includes: a first encoding module, configured to encode an I-frame image to obtain a first reconstructed image; a second encoding module, configured to encode an image between the I-frame image and a recovery point to obtain a second reconstructed image; a first refreshing module, configured to refresh the second reconstructed image to obtain a first refreshed image; and a third encoding module, configured to encode the corresponding image at the recovery point by using at least one of the first reconstructed image and the first refreshed image as a reference image.

A decoder is provided in an embodiment of the present disclosure. The decoder includes: a first decoding module, configured to decode an I-frame image to obtain a first decoded image; a second decoding module, configured to decode an image between the I-frame image and a recovery point to obtain a second decoded image; a second refreshing module, configured to refresh the second decoded image to obtain a second refreshed image; and a third decoding module, configured to decode the corresponding image at the recovery point by using at least one of the first decoded image and the second refreshed image as a reference image.

An image processing system is provided in an embodiment of the present disclosure. The system includes: an encoder, configured to encode an I-frame image to obtain a first reconstructed image, encode an image between the I-frame image and a recovery point to obtain a second reconstructed image, refresh the second reconstructed image to obtain a first refreshed image, encode the corresponding image at the recovery point by using any one or combination of the first reconstructed image and the first refreshed image as reference image; and a decoder, configured to decode an I-frame image to obtain a first decoded image, decode a reference image between the I-frame image and a recovery point to obtain a second decoded image, refresh the second decoded image to obtain a second refreshed image, decode the corresponding image at the recovery point by using at least one of the first decoded image and the second refreshed image as a reference image.

By using a refreshing technology in the embodiments of the present disclosure, it is not necessary to restrict the quantity or the predictive feature of the reference images at the encoder, thus accomplishing higher coding efficiency.

DETAILED DESCRIPTION

Figure 1:
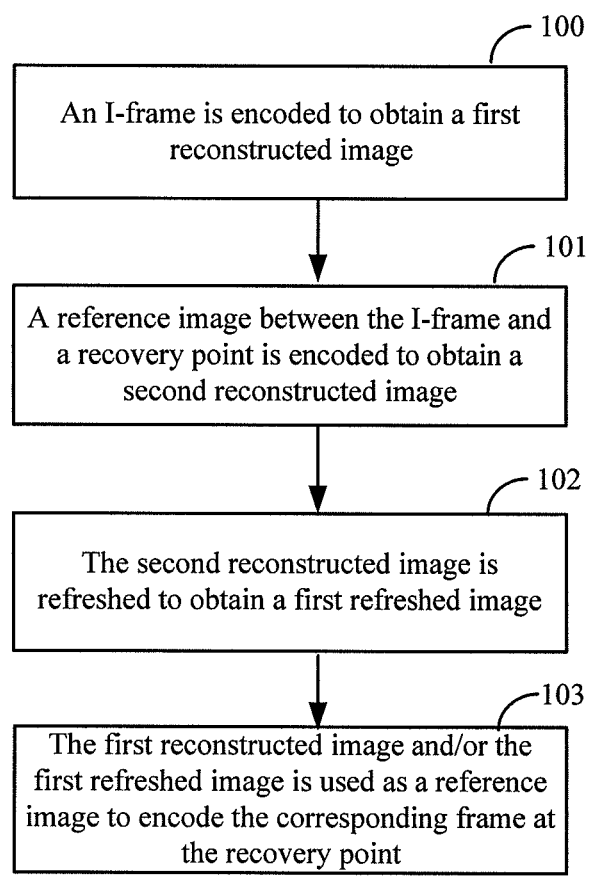
FIG. 1 illustrates an encoding process according to an embodiment of the present disclosure.

In the embodiments of the present disclosure, at the encoder, an I-frame image is encoded to obtain a first reconstructed image, a reference image between the I-frame image and a recovery point is encoded to obtain a second reconstructed image, the second reconstructed image is refreshed to obtain a first refreshed image, and the first reconstructed image and/or the first refreshed image is used as reference image to encode the corresponding image at the recovery point. Accordingly, at the decoder, an I-frame image is decoded to obtain a first decoded image, a reference image between the I-frame image and a recovery point is decoded to obtain a second decoded image, the second decoded image is refreshed to obtain a second refreshed image, and the first decoded image and/or the second refreshed image is used as reference image to decode the corresponding image at the recovery point. In the decoding process, the second decoded image is refreshed to obtain the second refreshed image, and is displayed as the second refreshed image. In this way, even if a reference frame is lost, the second refreshed image can be obtained at the decoder. Therefore, random access can be performed by using each I-frame as a random access cut-in point in the case of multi-reference image random access, thus significantly improving the flexibility of multi-reference image random access.

A random access cut-in point is a point from which the random access starts. The decoding starts from the random access cut-in point at the decoder but the decoded image is not necessarily correct. A recovery point is a point from which correct decoding starts at the decoder, and the decoded image is completely consistent with the coded image at the encoder.

The reconstructed image refers to an image obtained after each image is reconstructed at the encoder. The decoded image refers to an image obtained after each image is decoded at the decoder. The refreshed image refers to an image obtained after the reconstructed image is refreshed at the encoder or an image obtained after the decoded image is refreshed at the decoder. Refreshing refers to an operation performed for the reconstructed image at the encoder so that the obtained refreshed image is independent of the image content before the random access cut-in point, or refers to an operation performed for the decoded image at the decoder so that the obtained refreshed image is independent of the image content before the random access cut-in point. It shall be noted that, the refreshing operation may use the specific information of the image before the random access point (for example, the information carried in the image header). Such information may be transmitted repeatedly in the bit stream so that the decoder can obtain the refreshed image correctly. In order to decode the image correctly, the refreshing technology applied at the encoder needs to be consistent with that applied at the decoder. Besides, for an inter-frame predictive image, the image needs to be coded at the encoder to obtain a reconstructed image, and decoded at the decoder to obtain a decoded image. The image may also be refreshed; for example, the reconstructed image of P-frame, reconstructed image of B-frame or decoded image is refreshed to obtain a refreshed image. However, when the corresponding frame at the coverage point is coded, only the refreshed image of the reference image (for example, the first refreshed image corresponding to the P-frame) is used as a reference image. Of course, the first reconstructed image corresponding to the I-frame may also be used as a reference image instead of the refreshed image corresponding to the B-frame.

The refreshing operation may be performed at the block level, macro block level, slice level, or image level respectively, depending on the requirement on the quality of the recovered image and the complexity of implementation.

For example, in the case of refreshing at the image level, the previous image may serve as a recovered image simply, or the gray image (Y=128, Cr=128, Cb=128) may serve as a recovered image.

In another example, in the case of refreshing at the macro block level or the block level, some macro blocks or blocks in the images to be refreshed may directly or indirectly using the image before the random access cut-in point as a reference image. For such macro blocks or blocks, multiple methods are applicable so that such macro blocks or blocks may be refreshed in the case that the reference image is lost. The macro block level or block level may be refreshed in multiple ways such as simple replacement. For example, the image is replaced with a specific pixel value (for instance, gray value Y=128, Cr=128, Cb=128). This method is equivalent to setting the lost reference image as the gray image by default, or replacing the lost reference image with the macro block or block at the corresponding location of the previous image. In another example, the refreshing operation is performed through motion vector scaling. At the decoder, the motion vector is scaled so that it is directed to the I-frame at the random access cut-in point, or directed to the refreshed image of the P-frame. After the scaling, the predicted value of the current macro block or block is obtained. The predicted value is added to the corresponding residual value to finish the image reconstruction. The above method assumes that the motion is uniform motion. In another example, the refreshing operation is performed through intra-frame prediction, and the macro blocks or blocks that cannot be decoded correctly for lack of the reference image are refreshed according to the information about the macro blocks around the current frame. It shall be noted that, because the refreshing operation may be performed after decoding of the image, the intra-frame prediction method here may make full use of the information about the blocks around the current macro block, without being limited to the information about the upper adjacent blocks and the left adjacent blocks.

As shown in FIG. 1, an encoding process is provided in an embodiment of the present disclosure. The encoding process includes the following steps:

Step 100: An I-frame is encoded to obtain a first reconstructed image.

Step 101: A reference image between the I-frame image and a recovery point is encoded to obtain a second reconstructed image.

Step 102: The second reconstructed image is refreshed to obtain a first refreshed image.

Step 103: The first reconstructed image and/or the first refreshed image is used as reference image to encode the corresponding frame at the recovery point. For the recovery point, its reference image may include only the first reconstructed image, or include only the first refreshed image, or include both the first reconstructed image and the first refreshed image, depending on the quantity of the reference images and the location of the recovery point.

The first reconstructed image and/or the first refreshed image is independent of the image before the random access cut-in point. Therefore, the first reconstructed image and/or the first refreshed image serves as reference image for encoding of the subsequent images, thus preventing error spreading caused by loss of the random access reference image.

Figure 2:
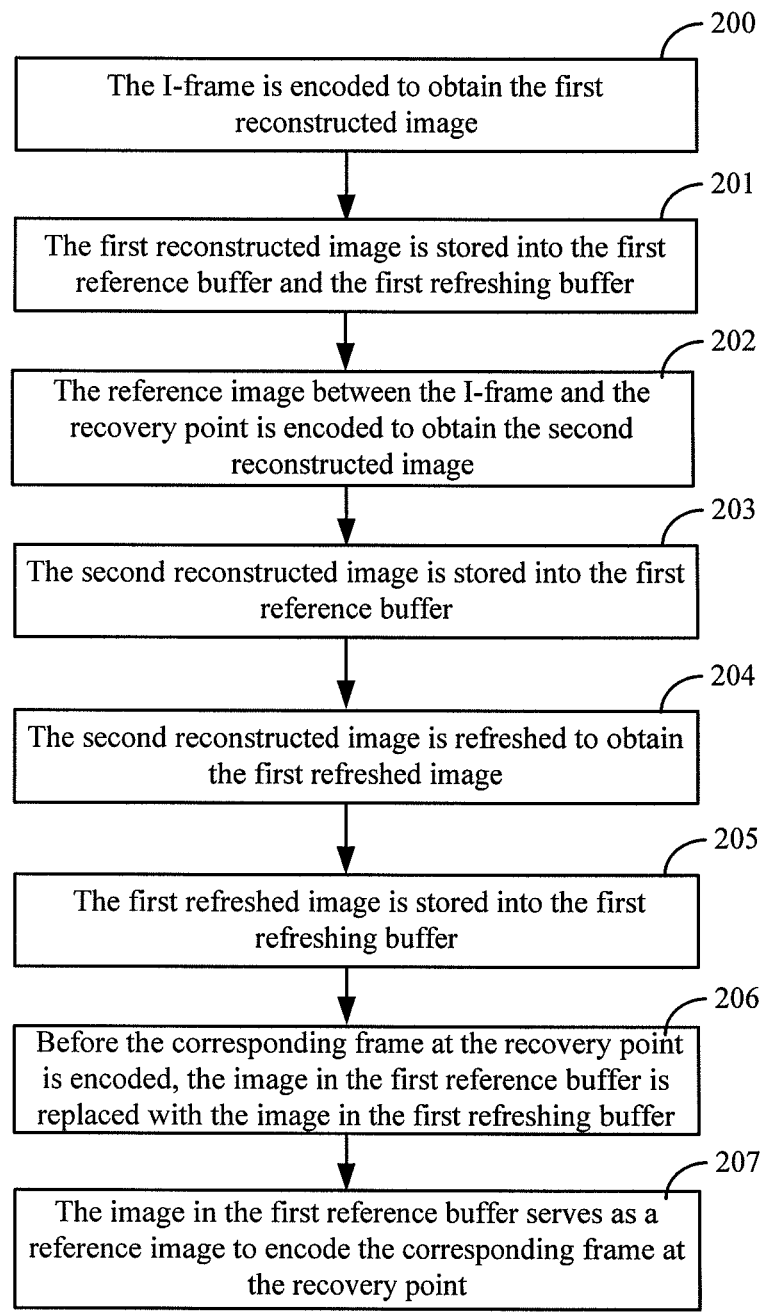
FIG. 2 illustrates another encoding process according to an embodiment of the present disclosure.

In an embodiment of the present disclosure, at the time of encoding, a reference buffer and a refreshing buffer are introduced. For example, both the reference buffer and the refreshing buffer serve as First In First Out (FIFO) buffers. The first reconstructed image and the second reconstructed image are stored into the first reference buffer, and the first reconstructed image and the first refreshed image are stored into the first refreshing buffer, where the size of the refreshing buffer may be optimized to save the storage overhead. A majority of the image content in the refreshing buffer is the same as the content in the reference buffer, and only a minority part differs. The refreshing buffer may store only this different part, and does not need to store the same part in the reference buffer, thus improving the utilization ratio of the buffer. At the time of encoding the corresponding image at the recovery point, the image in the first refreshing buffer replaces the image in the first reference buffer, and then the image in the first reference buffer serves as a reference image to perform coding. As shown in FIG. 2, the process includes the following steps:

Step 200: The I-frame is encoded to obtain the first reconstructed image.

Step 201: The first reconstructed image is stored into the first reference buffer and the first refreshing buffer respectively.

Step 202: The reference image between the I-frame image and the recovery point is encoded to obtain the second reconstructed image.

Step 203: The second reconstructed image is stored into the first reference buffer.

Step 204: The second reconstructed image is refreshed to obtain the first refreshed image.

Step 205: The first refreshed image is stored into the first refreshing buffer.

Step 206: Before the corresponding frame at the recovery point is encoded, the image in the first refreshing buffer replaces the image in the first reference buffer.

Step 207: The image in the first reference buffer serves as a reference image to encode the corresponding frame at the recovery point.

The image in the refreshing buffer is independent of the image before the random access cut-in point. Therefore, the image in the first refreshing buffer replaces the image in the first reference buffer, and serves as a reference image for encoding of the subsequent images, thus preventing error spreading caused by loss of the random access reference image.

A specific instance is given below:

A GOP structure is selected: . . . , $IB_1B_2P_1B_3B_4P_2B_5B_6P_3 \ldots P_nB_{2n+1}B_{2n+2}P_{n+1} \ldots P_m \ldots$, $IB_1B_2P_1B_3B_4P_2B_5B_6P_3, \ldots$, the quantity of reference images is set to n (which is the quantity of reference images allowed by the P-frame and the B-frame), the first I-frame is defined as a random access cut-in point, and the Pm frame is a recovery point.

Figure 3:
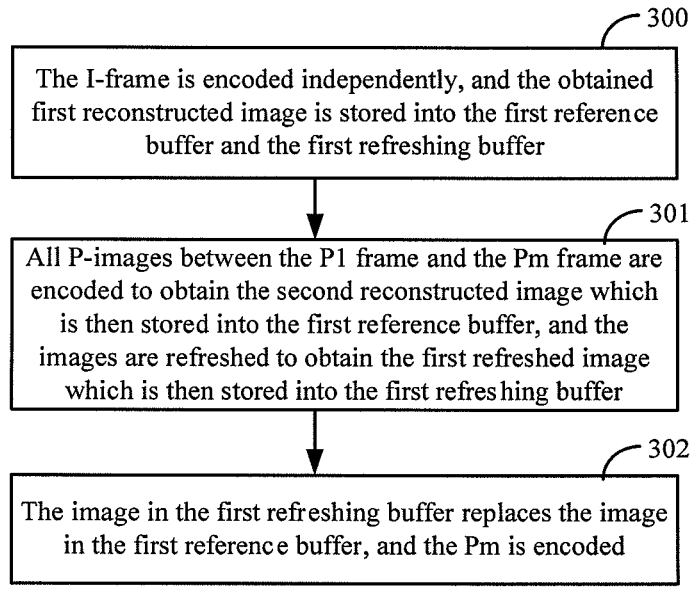
FIG. 3 illustrates processing of an encoding instance according to an embodiment of the present disclosure.

From the I-frame at the random access cut-in point to the Pm frame (exclusive of the Pm frame), normal coding is performed, with n reference frames. After each reference image is coded, its reconstructed image is stored into the first reference buffer, where the first reconstructed image of the I-frame is also stored into the first refreshing buffer. Afterward, the second reconstructed image between the I-frame and the Pm frame is refreshed so that the refreshed image is independent of the image before the I-frame, and the second reconstructed image after being refreshed is stored into the first refreshing buffer. As shown in FIG. 3, the refreshing process includes:

Step 300: The I-frame is encoded independently, and the obtained first reconstructed image is stored into the first reference buffer and the refreshing buffer respectively.

Step 301: For all P-images from the P1 frame to the Pm frame (exclusive of the Pm frame), their second reconstructed images after being coded are refreshed so that the refreshed images are independent of the images before the I-frame, and the first refreshed image after being refreshed is stored into the first refreshing buffer. Specifically, for all P-images from the P1 frame to the Pn frame (exclusive of the Pn frame), their reconstructed images are refreshed so that the refreshed images are independent of the images before the I-frame, and the refreshed images after being refreshed are stored into the first refreshing buffer. For all P-images from the Pn frame to the Pm frame (exclusive of the Pm frame), their reconstructed image is refreshed, and the generated refreshed image is stored into the first refreshing buffer. Because the first refreshing buffer is full at this time, the earliest image in the first refreshing buffer is removed. The Pm frame and the p-image subsequent to the Pm frame do not need to be refreshed or stored into the first refreshing buffer.

Step 302: The Pm frame is encoded. Before the encoding, the image in the first refreshing buffer replaces the image in the first reference buffer. Afterward, the Pm frame is encoded, with n frames used for reference. The reconstructed image of the Pm frame is stored into the first reference buffer. At this time, the first reconstructed image and the first refreshed image in the first reference buffer are independent of the image before the I-frame. Therefore, the generated Pm encoded image is independent of the image before the I-frame. In this way, the Pm frame can always be decoded correctly at the decoder. The images from the Pm frame to the end of the GOP are encoded normally, with n frames used for reference. The image in the current first reference buffer is independent of the frames before the I-frame. Therefore, such frames are independent of the images before the I-frame, and can always be decoded correctly at the decoder. By now, the whole GOP has been encoded.

To sum up, the reconstructed image, obtained after the image between the I-frame at the random access cut-in point and the Pm frame at the recovery point is encoded, needs to be refreshed to obtain the first refreshed image, which is stored into the refreshing buffer. Being independent of the coding process, the refreshing process is: At the Pm of the recovery point, the image in the refreshing buffer replaces the image in the reference buffer for the purpose of encoding of the Pm frame and the images after the Pm frame.

Table 1 describes the process of refreshing each image at the encoder, taking the IBBP GOP structure whose length is 15 frames as an example. The encoding always uses the image in the reference buffer as reference, without changing the encoding process. The reconstructed image generated in the encoding process is stored into the reference buffer. The refreshed image generated in the refreshing process is stored into the refreshing buffer. The refreshed image of the B-image is not stored into the refreshing buffer. The content in the refreshing buffer replaces the reference buffer only when the recovery point (taking P3 as an example) arrives, and then the image at the recovery point and the images subsequent to the recovery point are encoded. No refreshing operation is performed from the recovery point to the next random access point.

TABLE 1

| | Coded Image GOP | Reconstructed Image | Refreshed Image | Refreshing Process |
|---|---|---|---|---|
| Random access cut-in point | I | I' | I" | The reconstructed image of the I-frame is stored into the refreshing buffer directly, wherein I' = I". |
| | B | B' | B" | No refreshing is required. |
| | B | B' | B" | |
| | P1 | P1' | P1" | The reconstructed image P1' is refreshed to generate a refreshed image P1", which is stored into the refreshing buffer. |
| | B | B' | B" | No refreshing is required. |
| | B | B' | B" | |
| | P2 | P2' | P2" | By using I" and P1" as reference images, the P2' is refreshed to generate a P2", which is stored into the refreshing buffer. |
| | B | B' | B" | No refreshing is required. |
| | B | B' | B" | |
| Recovery point | P3 | P3' | | Before P3 coding, P1" and P2" replace P1' and P2' respectively. No refreshing is required. |
| | B | B' | | No refreshing is required. |
| | B | B' | | |
| | P4 | P4' | | |
| | B | B' | | |
| | B | B' | | |
| Random access cut-in point | I | I' | I" | The previous GOP refreshing process is repeated |
| | B | B' | B" | |
| | B | B' | B" | |
| | P1 | P1' | P1" | |
| | B | B' | B" | |
| | B | B' | B" | |
| | ... | ... | ... | |

The recovery point and the corresponding random access cut-in point may be located in the same GOP (as shown in Table 1) or located in different GOPs. Table 2 shows the refreshing process of each image in the case that the recovery point and the corresponding random access cut-in point are in different GOPs. Still taking the IBBP GOP structure whose length is 12 frames as an example, the recovery point is in the next GOP (wherein recovery point 1 corresponds to random access cut-in point 1):

TABLE 2

| | Coded Image GOP | Reconstructed Image | Refreshed Image | Refreshing Process |
|---|---|---|---|---|
| Random access point 1 | I | I' | I" | The reconstructed image of the I-frame is stored into the refreshing buffer directly, wherein I' = I". |
| | B | B' | B" | No refreshing is required. |
| | B | B' | B" | |
| | P1 | P1' | P1" | The reconstructed image P1' is refreshed to generate a refreshed image P1", which is stored into the refreshing buffer. |
| | B | B' | B" | No refreshing is required. |
| | B | B' | B" | |
| | P2 | P2' | P2" | By using I" and P1" as reference images, the P2' is refreshed to generate a P2", which is stored into the refreshing buffer. |
| | B | B' | B" | No refreshing is required. |
| | B | B' | B" | |
| | P3 | P3' | P3" | By using I" and P2" as reference images, the P3' is refreshed to generate a P3", which is stored into the refreshing buffer. |
| | B | B' | B" | No refreshing is required. |
| | B | B' | B" | |
| Random access point 2 | I | I' | I" | The reconstructed image of the I-frame is stored into the refreshing buffer directly, wherein I' = 1". |
| | B | B' | B" | No refreshing is required. |
| | B | B' | B" | |
| Recovery point 1 | P1 | P1' | P1" | Before P1 coding, P3" and I" replace P3' and I' to perform coding and generate a reconstructed image P1'. The reconstructed image P1' is refreshed to generate a refreshed image P1", which is stored into the refreshing buffer. |
| | B | B' | B" | No refreshing is required. |
| | B | B' | B" | |
| | P2 | P2' | P2" | By using I" and P1" as reference images, the P2' is refreshed to generate a P2", which is stored into the refreshing buffer. |
| | B | B' | B" | No refreshing is required. |
| | B | B' | B" | |
| | P3 | P3' | P3" | By using I" and P2" as reference images, the P3' is refreshed to generate a P3", which is stored into the refreshing buffer. |
| | B | B' | B" | No refreshing is required. |
| | B | B' | B" | |
| Random access point 3 | I | I' | I" | The previous GOP refreshing process is repeated. |
| | B | B' | B" | |
| | B | B' | B" | |
| Recovery point 2 | P1 | P1' | P1" | |
| | B | B' | | |

In the encoding process, the refreshing technology does not require any additional restriction at the encoder. For example, no restriction is imposed on the ¼ interpolation value and the loop filter. Such modules are operated after the refreshing process, thus the refreshing process brings no influence to the modules. In an example, for the intra block (intra-frame coded block), the reference image is lost due to random access, some macro blocks or blocks may refer to the lost reference image directly, and refreshing is required. Besides, some intra blocks may be affected by the loss of the reference image. When a block around the intra block needs to be refreshed, the intra block is still vulnerable to influence caused by the lost reference image. Such intra blocks may also be consulted by subsequent reference images, and still tend to cause error spreading. A practicable solution is: Such intra blocks are also refreshed, just like the macro blocks that use the frames before the I-frame as reference. In fact, the special intra blocks are few, and the error spreading caused by the intra block is weak and imposes little influence on the subsequent images. A satisfying effect is achieved even if no refreshing is performed.

In the whole coding process, high coding efficiency is accomplished without restricting the quantity of the reference images or the predictive reference feature. Compared with the normal coding that use multiple images as reference, the bit streams generated through the refreshing technology accomplish the highest coding efficiency without imposing any restriction on the images from the I-frame to the recovery point; the coding efficiency of the images subsequent to the recovery point is somewhat lower because they refer to the images in the refreshing buffer directly or indirectly. Therefore, the coding efficiency is related to the selection of the location of the recovery point. The location of the recovery point may be set according to the coding efficiency.

Specifically, the selection of the location of the recovery point is handled in the following scenarios (taking the IP1P2P3P4 GOP structure as an example, supposing that 2 frames are used for reference):

I. The first P-frame after the I-frame at the random access cut-in point is defined as a recovery point. In this case, only the reconstructed image of the I-frame exists in the refreshing buffer, and the images before the I-frame are not stored into the refreshing buffer. This scenario is equivalent to restricting the P-frame after the random access cut-in point to only one reference image. In fact, the coding efficiency is higher than that in the scenario which restricts that only one reference image is used for reference. That is because that the other reference image may be initialized as a specific image such as a gray image. The specific image may also be used by the P-frame after the I-frame as reference image.

II. The second P-frame after the I-frame at the random access cut-in point is defined as a recovery point. In this case, the first P-frame may still refer to two images to perform normal coding and keep the highest coding efficiency. The reconstructed image of the first P-frame is refreshed to generate a refreshed image, which is stored into the refreshing buffer. In this case, the refreshing buffer contains the reconstructed image of the I-frame and the refreshed image of the first P-frame. The quality of the refreshed image of the first P-frame is lower, and affects the coding efficiency of the second P-frame and the images subsequent to the second P-frame. That is a scenario in which the coding efficiency is the most deteriorated.

III. The last P-frame before the next random access cut-in point is defined as a recovery point. In this case, all images before the P-frame may keep the highest coding efficiency, but the P-frame itself still incurs deterioration of the coding efficiency. Compared with the second scenario, this scenario improves the coding efficiency.

IV. The first P-frame after the I-frame at the next random access cut-in point is defined as a recovery point. In this case, the reconstructed image of the I-frame at the next random access cut-in point in the buffer is refreshed, and the refreshed image of the last P-frame before the next random access cut-in point is refreshed. Therefore, in contrast to the normal coding which consults 2 frames, this scenario reduces the coding efficiency starting from the first P-frame after the I-frame at the next random access cut-in point. However, in contrast to the scenario which restricts consultation of only one reference image at the random access cut-in point (namely, scenario 1), this scenario enhances the coding efficiency of all inter-frame coded images. That is because: In contrast to scenario 1, this scenario replaces the gray image with the refreshed image of the P-frame, thus improving the image quality and the coding efficiency. Therefore, in this scenario, the coding efficiency is higher.

V. The first P-frame after the I-frame at the next n (n is an ordinal number of a positive integer greater than 1) random access cut-in point is defined as a recovery point. In this case, the reconstructed image of the I-frame in the buffer is refreshed, and the refreshed image of the last P-frame before the next n random access cut-in point is refreshed (the image quality of the refreshed image of the P-frame is improved greatly after continuous refreshing of multiple I-frames). The frequency of the occurrence of the recovery point is much less than that of the random access cut-in point. Therefore, as against scenario 4, this scenario further improves the coding efficiency.

VI. If the recovery point is in a farther place so that the refreshed image of the P-frame before the recovery point is exactly the same as the reconstructed image (because the quality of the refreshed image is closer to that of the reconstructed image after continuous refreshing of multiple I-frames), without causing deterioration of the coding efficiency. This scenario is equivalent to the normal coding which uses 2 reference frames, and accomplishes the highest coding efficiency.

VII. Here is a special scenario: If the recovery point is infinitely far, namely, if no recovery point occurs, the refreshing process does not affect the coding process at the encoder, and the refreshing process becomes video post-processing at the decoder. In this scenario, it is not necessary to modify the existing video encoding standard, the random access in the case of using 2 reference frames is still accomplishable, and each I-frame may be stored as a random access cut-in point.

To sum up, the recovery point may be set flexibly to accomplish a tradeoff between the coding efficiency and fast recovery of the correct decoding process.

In the specific implementation, the location of the recovery point may be predetermined by the encoder and the decoder. In this way, the encoder does not need to indicate the location of the recovery point in the data frame sent to the decoder. The decoder may determine the specific location of the recovery point according to the predetermined protocol. The location of the recovery point may also be indicated by the encoder in the data frame sent to the decoder. For example, the I-frame at the random access cut-in point carries identifier information (such as a specific number), indicating the next n (n is an ordinal number of a positive integer) P-frame after the I-frame to be a recovery point.

Figure 4:
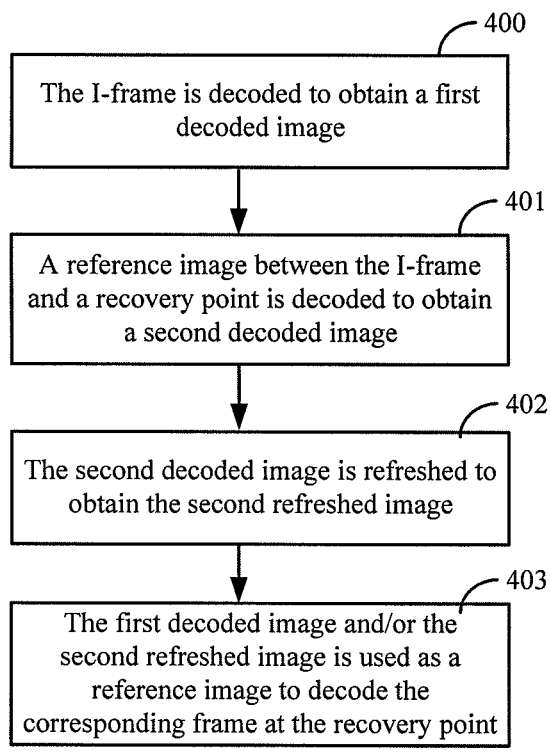
FIG. 4 illustrates a decoding process according to an embodiment of the present disclosure.

As shown in FIG. 4, a decoding process is provided in an embodiment of the present disclosure. The decoding process includes the following steps:

Step 400: An I-frame is decoded to obtain a first decoded image.

Step 401: A reference image between the I-frame image and a recovery point is decoded to obtain a second decoded image.

Step 402: The second decoded image is refreshed to obtain a second refreshed image.

Step 403: The first decoded image and/or the second refreshed image is used as reference image to decode the corresponding frame at the recovery point. For the recovery point, its reference image may include only the first decoded image, or include only the second refreshed image, or include both the first decoded image and the second refreshed image, depending on the quantity of the reference images and the location of the recovery point.

The first decoded image and the second refreshed image are independent of the image before the random access cut-in point. Therefore, the first decoded image and the second refreshed image serve as reference images for decoding of the subsequent images, thus preventing error spreading caused by loss of the random access reference image.

Figure 5:
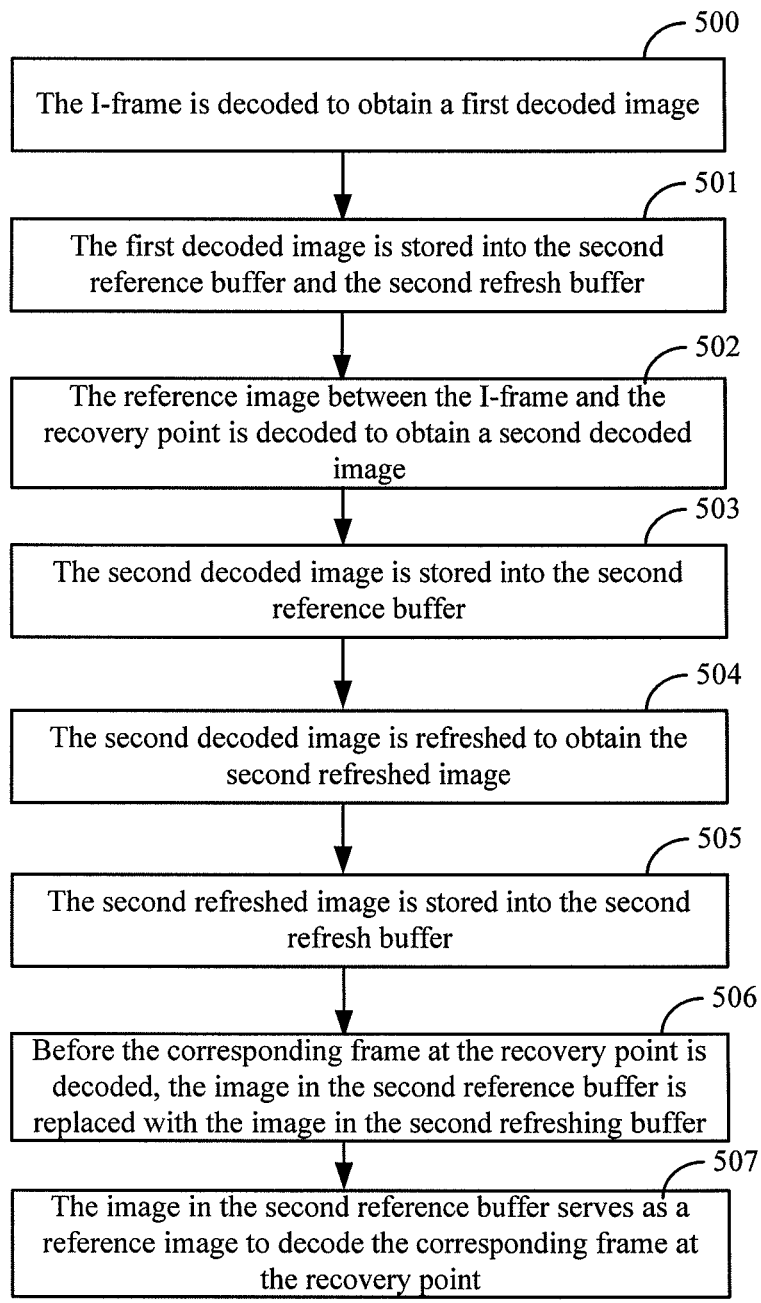
FIG. 5 illustrates another decoding process according to an embodiment of the present disclosure.

In an embodiment of the present disclosure, at the time of decoding, a reference buffer and a refreshing buffer are introduced. For example, both the reference buffer and the refreshing buffer serve as FIFO buffers. The first decoded image and the second decoded image are stored into the second reference buffer, and the first decoded image and the second refreshed image are stored into the second refreshing buffer. At the time of decoding the corresponding frame at the recovery point, the image in the second reference buffer is replaced with the image in the second refreshing buffer, and then the image in the second reference buffer serves as a reference image to perform decoding. As shown in FIG. 5, the process includes the following steps:

Step 500: The I-frame is decoded to obtain the first decoded image.

Step 501: The first decoded image is stored into the second reference buffer and the second refreshing buffer respectively.

Step 502: The reference image between the I-frame image and the recovery point is decoded to obtain the second decoded image.

Step 503: The second decoded image is stored into the second reference buffer.

Step 504: The second decoded image is refreshed to obtain a second refreshed image.

Step 505: The second refreshed image is stored into the second refreshing buffer.

Step 506: Before the corresponding frame at the recovery point is decoded, the image in the second reference buffer is replaced with the image in the second refreshing buffer.

Step 507: The image in the second reference buffer serves as a reference image to decode the corresponding frame at the recovery point.

The image in the refreshing buffer is independent of the image before the random access cut-in point. Therefore, the image in the second refreshing buffer replaces the image in the second reference buffer, and serves as a reference image for decoding of the subsequent images, thus preventing error spreading caused by loss of the random access reference image.

Still taking the GOP structure described in the embodiment corresponding to FIG. 3 as an example, from the I-frame at the random access cut-in point to the Pm frame (exclusive of the Pm frame), normal decoding is performed, with n reference frames being used. After each reference image is decoded, its decoded image is stored into the second reference buffer, where the first decoded image of the I-frame is also stored into the second refreshing buffer. Afterward, the second decoded image between the I-frame and the Pm frame is refreshed so that the refreshed image is independent of the image before the I-frame, and the second refreshed image after being refreshed is stored into the second refreshing buffer. The decoding process comes in two types: normal continuous decoding, where the reference image is always available; and decoding in the case of random access, where the reference image is lost.

Figure 6:
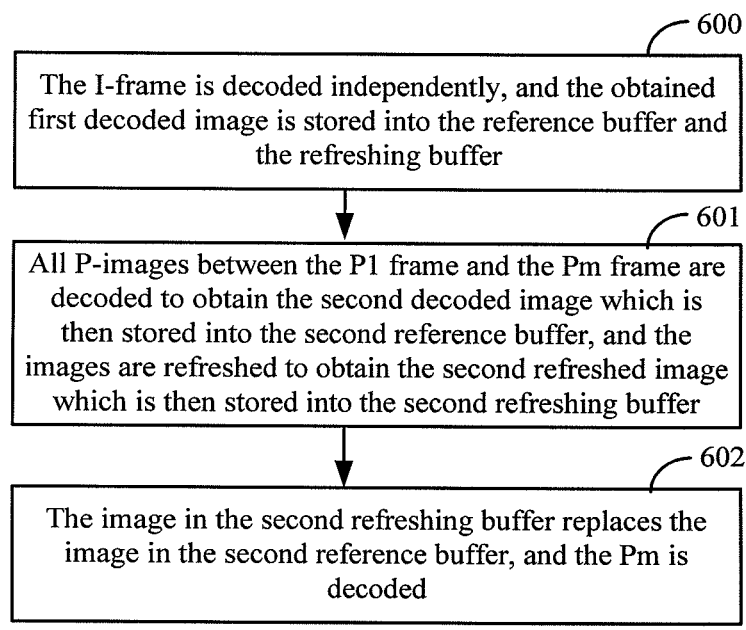
FIG. 6 illustrates processing of a decoding instance according to an embodiment of the present disclosure.

As shown in FIG. 6, a normal continuous decoding process provided in an embodiment of the present disclosure includes the following steps:

Step 600: The I-frame is decoded independently to obtain a first decoded image, and the obtained first decoded image is stored into the reference buffer and the refreshing buffer respectively.

Step 601: For all P-images from the P1 frame to the Pm frame (exclusive of the Pm frame), they are decoded and displayed normally, their second decoded image after being decoded is refreshed so that the refreshed images are independent of the images before the I-frame, and the second refreshed image after being refreshed is stored into the second refreshing buffer. The update of the second refreshing buffer is the same as that of the encoder, and the refreshing technology applied is the same as that applied at the encoder.

Step 602: The Pm frame is decoded. Before the decoding, the image in the second refreshing buffer replaces the image in the second reference buffer. Afterward, the Pm frame is decoded, with n reference frames being used. The decoded image is stored into the reference buffer, without being refreshed or stored into the refreshing buffer. At this time, the first decoded image and the second refreshed image in the reference buffer are independent of the image before the I-frame. Therefore, the generated Pm decoded image is independent of the image before the I-frame. In this way, the Pm frame is always decoded correctly at the decoder. The frames subsequent to the Pm frame until the end of the GOP are decoded and displayed normally, with n reference frames being used. The decoded image does not need to be refreshed or stored into the refreshing buffer. The image in the current reference buffer is independent of the frames before the I-frame. Therefore, such frames are independent of the images before the I-frame, and are decoded correctly. By now, the whole GOP has been decoded.

Figure 7:
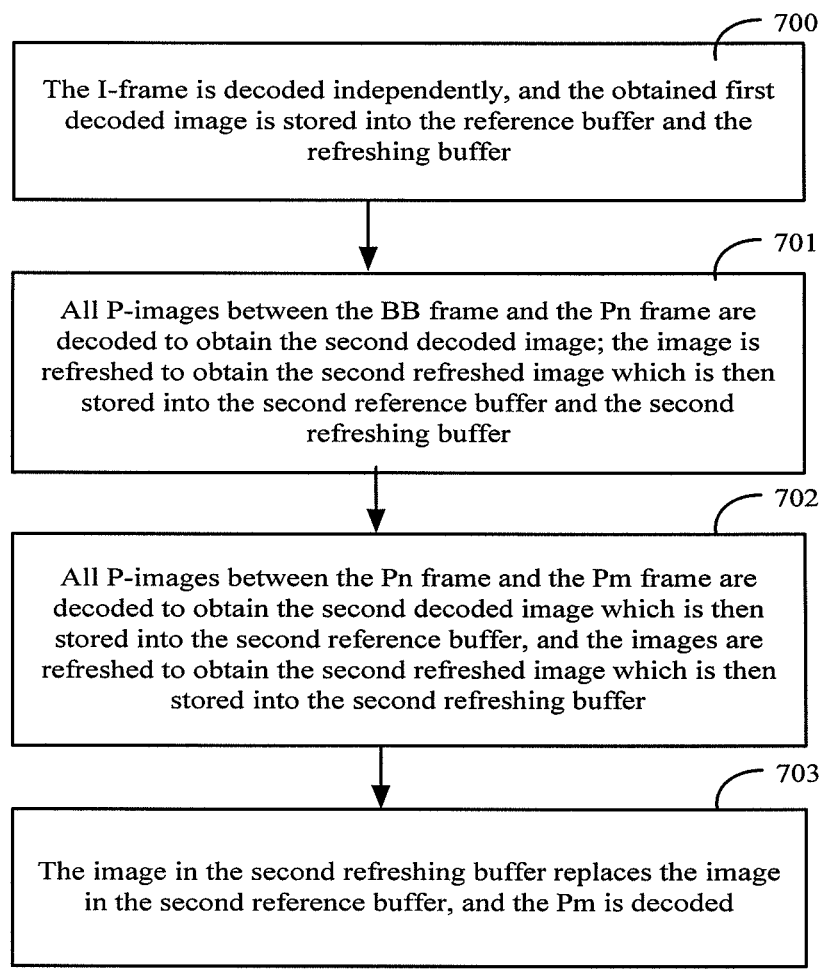
FIG. 7 shows processing of a decoding instance according to another embodiment of the present disclosure.

As shown in FIG. 7, a decoding process in the case of random access provided in an embodiment of the present disclosure includes the following steps:

Step 700: The I-frame at the random access cut-in point is decoded and displayed normally. The first decoded image after the decoding operation is stored into the second reference buffer and the second refreshing buffer concurrently.

Step 701: Starting from the B1B2 frame until the Pn−1 frame, some macro blocks or blocks cannot be decoded correctly because the images before the I-frame are used as reference image. For such macro blocks or blocks, the image needs to be refreshed. The refreshing technology applied is the same as that applied at the encoder, and a refreshed image is generated and stored into the display buffer. The refreshed image is stored into the second reference buffer and the second refreshing buffer.

Step 702: The images from the Pn frame to the Pm frame (exclusive of the Pm frame) are decoded and displayed, with n reference frames being used. The decoded image is stored into the second reference buffer. The decoded image is refreshed to obtain a refreshed image, stored into the second refreshing buffer, and also stored into the display buffer for displaying.

Such images use the refreshed image as a reference image at the time of decoding. The refreshed image differs from the reference image applied at the encoder. Therefore, their decoded images are not completely correct.

Step 703: The images from the Pm frame to the end of the GOP are decoded and displayed normally, with n reference frames being used. The decoded image is stored into the second reference buffer and the second refreshing buffer respectively.

Starting from decoding of the Pm frame, the images in the second reference buffer are consistent with the reference images applied at the encoder. Therefore, the images can be decoded correctly. The decoded image is completely consistent with the reconstructed image at the encoder. By now, the whole GOP has been decoded.

The above decoding process reveals that in the case of random access, the decoding starts from the I-frame at the random access cut-in point. Although the decoding of the subsequent images lacks the reference image, the decoder does not need to discard the images. Instead, the image may be refreshed through a refreshing technology. The refreshed image may be displayed, thus improving the subjective experience of the user. The quality of the refreshed image depends on the refreshing technology applied. Starting from the Pm frame at the recovery point, the decoded image is completely correct, thus preventing error spreading caused by loss of the reference image.

Evidently, the processing at the decoder includes two processes: a decoding process in the case of random access, and a continuous normal decoding process. Corresponding to the encoder, the recovery point and the corresponding random access cut-in point may be located in the same GOP or in different GOPs. Corresponding to the refreshing process at the encoder shown in Table 2, still taking the IBBP GOP structure whose length is 12 frames) as an example, the recovery point is in the next GOP (wherein recovery point 1 corresponds to random access cut-in point 1), and the decoding process and the refreshing process involved are described in Table 3:

TABLE 3

| | Coded Image GOP | Decoded Image | Refreshed Image | Process |
|---|---|---|---|---|
| Random access point 1 | I | I' | I'' | The decoded image of the I-frame is stored into the reference buffer and the refreshing buffer directly, wherein I' = I''. |
| | B | B' | B'' | The decoded image B' is refreshed to generate a refreshed image B1'', which is not stored into the refreshing buffer but is available for display. |
| | B | B' | B'' | |
| | P1 | P1' | P1'' | The decoded image P1' is refreshed to generate a refreshed image P1'', which is stored into the reference buffer and the refreshing buffer. |
| | B | B' | B'' | The decoded image B' is refreshed to generate a refreshed image B1'', which is not stored into the refreshing buffer but is available for display. |
| | B | B' | B'' | |
| | P2 | P2' | P2'' | By using I'' and P1'' as reference images, the image is refreshed to generate a P2'', which is stored into the reference buffer and the refreshing buffer. |
| | B | B' | B'' | The decoded image B' is refreshed to generate a refreshed image B1'', which is not stored into the refreshing buffer but is available for display. |
| | B | B' | B'' | |
| | P3 | P3' | P3'' | By using P1'' and P2'' as reference images, the image is refreshed to generate a P3'', which is stored into the reference buffer and the refreshing buffer. |
| | B | B' | B'' | The decoded image B' is refreshed to generate a refreshed image B1'', which is not stored into the refreshing buffer but is available for display. |
| | B | B' | B'' | |
| Random access point 2 | I | I' | I'' | The decoded image I' of the I-frame is stored into the reference buffer and the refreshing buffer directly, I' = I''. |
| | B | B' | B'' | Normal decoding is performed (at this time, the reference buffer contains P3'' and I''). Now the random access decoding process is finished, and the continuous normal decoding process begins. |
| | B | B' | B'' | |
| Recovery point 1 | P1 | P1' | P1'' | Before the decoding, the image in the refreshing buffer replaces the image in the reference buffer. Normal decoding is performed (at this time, the reference buffer contains P3'' and I''). The decoded image P1' is completely correct. The decoded image P1' is refreshed to generate a refreshed image P1'', which is stored into the refreshing buffer. Starting from this point, the subsequent images can be decoded correctly |
| | B | B' | | The images are decoded normally, and the decoded image B' is completely correct. No refreshing is required. |
| | B | B' | | |
| | P2 | P2' | P2'' | The images are decoded normally, and the decoded image P2' is completely correct. By using I'' and P1'' as reference images, the P2' is refreshed to generate a P2'', which is stored into the refreshing buffer. |

TABLE 3-continued

| Coded Image GOP | Decoded Image | Refreshed Image | Process |
|---|---|---|---|
| B | B' | | The images are decoded normally, and the decoded image B' is completely correct. No refreshing is required. |
| B | B' | | |
| P3 | P3' | P3" | The images are decoded normally, and the decoded image P3' is completely correct. By using P1" and P2" as reference images, the P3' is refreshed to generate a P3", which is stored into the refreshing buffer. |
| B | B' | | The images are decoded normally, and the decoded image B' is completely correct. No refreshing is required. |
| B | B' | | |
| Random access point 3    I | I' | I" | The previous GOP process is repeated. |
| | B | B' | B" |
| | B | B' | B" |
| Recovery point 2    P1 | P1' | P1" | |
| | B | B' | B" |

Taking the random access in the digital video broadcast as an example, the encoding method and the decoding method provided herein are detailed below:

The GOP structure commonly used in the digital video broadcast is IBBP1BBP2BBP3BB, whose GOP length is 12 frames. The structure of the GOP is applicable to the video coding standards such as AVS and H.264. The GOP structure is described below, taking the AVS standard as an example. The quantity of the reference images is set to 2, the random access period is set to 0.5 s, and the recovery period is set to 0.5 s. Each I-frame may serve as a random access cut-in point, and the first P-frame after the I-frame is specified as a recovery point.

The encoder performs encoding operation normally, with 2 reference frames being used. The reconstructed image is stored into the first reference buffer. The reconstructed image of the reference image (I, P) is refreshed to generate a refreshed image. The process is as follows:

The I-frame is encoded normally. The reconstructed image is stored into the first reference buffer, and stored into the first refreshing buffer without being refreshed. At this time, the first refreshing buffer further stores the refreshed image of the last P-frame of the previous GOP.

The first group of BB frames are encoded normally (using the first reference buffer as a reference).

Before encoding of the first P-frame (namely, P1), the image in the first refreshing buffer replaces the content in the first reference buffer, and then the frame is encoded by using 2 reference frames. The reconstructed image is stored into the first reference buffer for the purpose of encoding of subsequent images. Subsequently, the reconstructed image of P1 is refreshed. The aforementioned refreshing technologies such as motion vector scaling, intra-frame prediction, or simple replacement may be applied. The refreshed image generated after the refreshing operation is stored into the first refreshing buffer.

The second group of BB frames are encoded normally (using the first reference buffer as a reference).

The second P-image (namely, P2) is encoded normally by using image in the first reference buffer as reference. The generated reconstructed image is stored into the first reference buffer. Meanwhile, the reconstructed image is refreshed by using the first refreshing buffer, and the generated refreshed image is stored into the first refreshing buffer.

The third group of BB frames are encoded normally (using the first reference buffer as a reference).

The third P-frame (namely, P3) is handled like P2. The P3 is encoded normally by using the image in the first reference buffer as reference. The generated reconstructed image is stored into the first reference buffer. Meanwhile, the reconstructed image is refreshed by using the first refreshing buffer, and the generated refreshed image is stored into the first refreshing buffer. At this time, the refreshed image serves as a reference image of the first P-frame of the next GOP. The P1, P2, and P3 are refreshed to update the images in the first refreshing buffer and get ready configured to replace the images in the first reference buffer subsequently.

The fourth group of BB frames are encoded normally (using the first reference buffer as a reference).

By now, the whole GOP has been encoded.

The continuous normal decoding process is described below.

The I-frame is decoded normally. The decoded image is stored into the second reference buffer, and stored into the second refreshing buffer without being refreshed. At this time, the second reference buffer and the second refreshing buffer further store the reconstructed image and the refreshed image of the last P-frame of the previous GOP.

The first group of BB frames are decoded normally (using the second reference buffer as a reference). The content in the second reference buffer is completely consistent with that in the coding. Therefore, the BB frame is decoded correctly.

Before decoding of the first P-frame (namely, P1), the image in the second refreshing buffer replaces the content in the second reference buffer, and then the frame is decoded by using 2 reference frames. The decoded image is stored into the second reference buffer for the purpose of decoding of subsequent images. Afterward, the decoded image of the P1 is refreshed through the refreshing technology identical to that applied at the coder. After the refreshing process, the generated refreshed image is stored into the second refreshing buffer. At the time of decoding the P1, the content in the second reference buffer is completely consistent with that in the encoding process. Therefore, the P1 frame is decoded correctly. At this time, the content of the second reference buffer is different from the content of the second refreshing buffer. The decoded image of P1 in the second reference buffer is related to the image before the I-frame, but the refreshed image of P1 in the second refreshing buffer is unrelated to the image before the I-frame.

The second group of BB frames are decoded normally (using the second reference buffer as a reference).

The second p-image (namely, P2) is decoded normally by using the second reference buffer as a reference. The generated decoded image is stored into the second reference buffer. Meanwhile, the decoded image is refreshed by using the second refreshing buffer, and the generated refreshed image is stored into the second refreshing buffer. The refreshing technology applied is the same as that applied at the encoder.

The third group of BB frames are decoded normally (using the second reference buffer as a reference).

The third P-frame (namely, P3) is handled like P2. The P3 is decoded normally by using the second reference buffer as reference. The generated decoded image is stored into the second reference buffer. Meanwhile, the decoded image is refreshed by using the second refreshing buffer, and the generated refreshed image is stored into the second refreshing buffer. At this time, the refreshed image serves as a reference image of the first P-frame of the next GOP.

The fourth group of BB frames are decoded normally (using the second reference buffer as a reference).

By now, the whole GOP has been decoded.

Evidently, in the whole decoding process, the content in the reference buffer is always consistent with that in the encoding process. Therefore, all images are decoded correctly.

The processing in the case of random access at the decoder is described below.

The random access cut-in point is an I-frame, but correct decoding starts from the recovery point of the next GOP. The reference image from the random access cut-in point to the recovery point is refreshed through the refreshing technology until the correct decoding is achieved at the recovery point. The objectives of the refreshing technology applied in the random access decoding process are: On the one hand, the refreshed image is available for display, which improves the subjective experience at the time of random access; on the other hand, the refreshed image of the last P-frame of the current GOP is obtained and used as the reference image of the next GOP/recovery point. The continuous normal decoding process starts upon completion of the random access decoding process.

Specifically, the I-frame at the random access cut-in point is decoded normally. The decoded image is stored into the second reference buffer and the second refreshing buffer. At this time, the second reference buffer and the second refreshing buffer contain only the reconstructed image of the I-frame. The decoded image of the I-frame is stored into the display buffer.

The decoding of the first group of BB frames may be incorrect for lack of a reference image. Such frames may be discarded, or refreshed through the refreshing technologies such as motion vector scaling, intra-frame prediction, or simple replacement. The refreshed image is stored into the display buffer for displaying.

The decoding of the first P-frame (namely, P1) may be incorrect for lack of a reference image. In this case, the refreshing technology applied at the encoder needs to be applied in the decoding. After the refreshing, the generated refreshed image is stored into the second reference buffer and the second refreshing buffer respectively. The refreshed image is refreshed and available for display.

The second group of BB frames can be decoded correctly because the reference image is available. The decoded image is available for display.

The second p-image (namely, P2) can be decoded correctly because the reference image is available. The generated decoded image is stored into the second reference buffer and the second refreshing buffer respectively. The decoded image is available for display.

The third group of BB frames can be decoded correctly because the reference image is available. The decoded image is available for display.

The third P-frame (namely, P3) is handled like P2. The P3 is decoded normally by referring to the second reference buffer. The generated decoded image is stored into the second reference buffer and the second refreshing buffer respectively. At this time, the refreshed image serves as a reference image of the first P-frame of the next GOP.

The fourth group of BB frames are decoded normally (using the second reference buffer as a reference).

By now, the whole GOP has been decoded.

The next GOP is decoded according to the continuous normal decoding process.

Evidently, at the time of random access, the first P-frame and the first group of BB frames after the random access cut-in point cannot be decoded for lack of a reference image at the decoder, and need to be refreshed to obtain a refreshed image. After the P1 frame is refreshed, the refreshed frame is stored into the reference buffer and the refreshing buffer for the purpose of decoding subsequent images. All the images from the P1 frame to the next recovery point can be decoded because the reference image is available. Although the quality of the decoded image is low, such decoded images are available for display, thus improving the subjective experience of the user. All the images that start from the next GOP or recovery point can be decoded correctly. The decoded image is consistent with the reconstructed image at the encoder.

In the above instance, fast random access is implemented through a refreshing technology without restricting the quantity of reference images or predictive features, and any I-frame is allowed to serve as a random access cut-in point. The random access mechanism is flexible. Moreover, the coding efficiency is higher as against the practice of restricting the quantity of reference images or reference features, and the bandwidth of the transmission channel is saved.

Random access is also involved in the edit and splicing of compressed bit streams, play of bit streams, and fast-forward and fast-backward in the Video On Demand (VOD). The compressed bit streams generated on the basis of the refreshing technology may better support such applications.

Support of the compressed bit streams generated by the encoder based on a refreshing technology makes each I-frame become a random access cut-in point. For the edit and splicing of the compressed bit streams as well as the fast-forward and fast-backward in the play control, the corresponding operations may be performed by using the I-frame as a cut-in point.

Compared with the practice of restricting the quantity of reference images or predictive reference features, the refreshing technology improves the flexibility of edit or bit stream play. Moreover, no additional restriction needs to be imposed on coding, high code compression efficiency is maintained, and the storage space is saved.

The method provided herein is also applicable to error recovery and frame loss recovery. In the video transmission process, loss of packets or frames may occur due to accumulated channel errors or abrupt errors, and may cause serious problems for the compressed bit streams based on multiple reference images. In the case that a frame is lost, the decoder cannot decode images correctly for lack of a reference image. Such images are usually discarded, thus affecting the subjective experience of the user. To make matters worse, the I-frame cannot eliminate error spreading due to use of the multi-reference image technology. The loss of the reference image affects the subsequent decoded images continuously, and the time of recovering the correct decoding is unpredictable.

The refreshing technology prevents the error spreading caused by the frame loss completely. Starting from the I-frame subsequent to the lost frame, the decoded image that lacks a reference image is refreshed. The refreshed image is available for display, thus improving the subjective experience of the user. Moreover, at the next recovery point, the error spreading caused by the frame loss is prevented completely, and the decoder can recover the correct decoding completely.

Besides, the bit stream switching technology is applied in the streaming transmission application to be adaptive to change of the network bandwidth. In a bit stream generated on the basis of the refreshing technology, each I-frame may serve as a random access cut-in point. Therefore, rather than occurring at a specific random access cut-in point, bit stream switching may occur at every I-frame, thus improving the flexibility of bit stream switching. Meanwhile, because it is not necessary to restrict the quantity of reference images or predictive reference features, the coding efficiency is higher, and the network bandwidth is saved.

In the case of switching between views in the Multi-view Video Coding (MVC), the switching may occur between the views in every I-frame rather than in only the IDR frame, thus improving the flexibility of switching.

The refreshing technology may be applied as a video post-processing technology, and supports the existing standards such as AVS and H.264 directly.

An ordinary encoder generates compressed bit streams without restricting the quantity of reference images or predictive features, and therefore, provides the highest coding efficiency but baffles random access to the compressed bit streams. Due to use of the multi-reference image technology, the subsequent inter-frame encoded image may refer to the images before the random access cut-in point directly or indirectly. Therefore, in the case that the reference image is lost due to random access, the subsequent inter-frame encoded image may incur direct or indirect influence, and the influence is spread continuously.

In fact, the error spreading caused by loss of the reference image does not go on infinitely. That is because the existence of the I-frame of the intra-frame predictive image in the bit stream partially prevents the error spreading. After enough I-frames are refreshed continuously, the error spreading caused by loss of the reference image is ultimately stopped, and the correct decoding is recovered. However, that process takes a long time and is not controllable. Moreover, the quality of the image decoded upon the random access cut-in point is inferior, and affects the subjective experience of the user.

By using the refreshing technology, in the case that random access occurs, the recovery of correct decoding is quickened, the image quality is improved, and the subjective experience of the user is improved. Starting from the I-frame after the random access cut-in point, the frames are refreshed, and the decoded images that lack a reference image are refreshed. Such images may be displayed immediately to improve the subjective experience of the user. At the same time, the refreshed images are refreshed so that they verge on the original images and may serve as a reference in the decoding of subsequent images, thus quickening recovery of the correct decoding.

Figure 8:
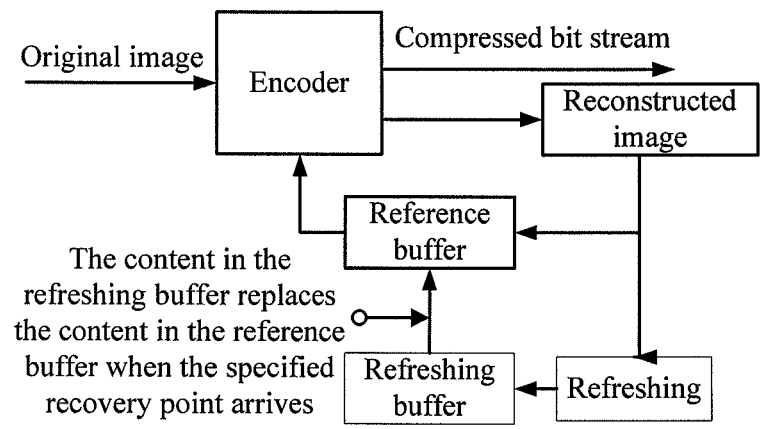
FIG. 8 illustrates buffer management related to a refreshing operation at the coder according to an embodiment of the present disclosure.
Figure 9:
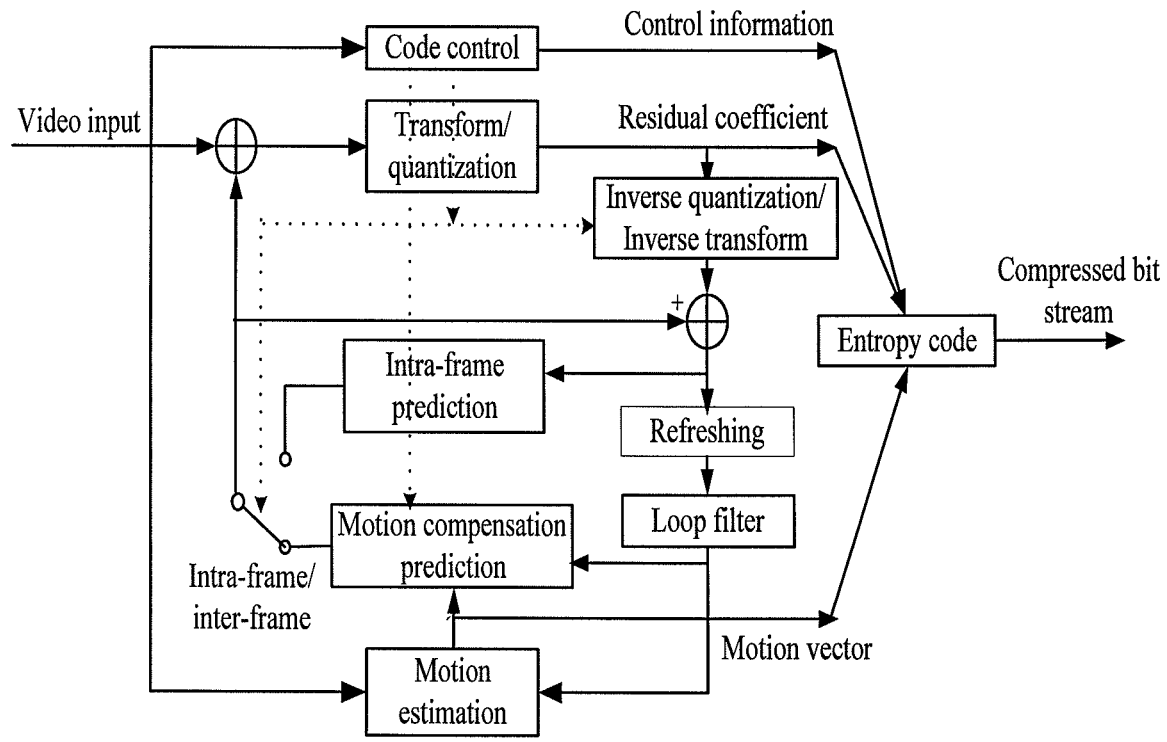
FIG. 9 illustrates a location of a refreshing operation in a coding framework according to an embodiment of the present disclosure.

Based on the same conception of the prevent disclosure, an encoder is provided herein. FIG. 8 shows the buffer management involved in the refreshing process. That is, at the encoder, a refreshing operation is added, and a refreshing buffer configured to store the refreshed images generated after the refreshing operation is added. The reconstructed image is refreshed, and the generated refreshed image is stored into the refreshing buffer. It shall be noted that only the refreshed images generated after refreshing of the reference images (I, P) are stored into the refreshing buffer. When the specified recovery point arrives, the content in the refreshing buffer replaces the content in the reference buffer, and then the image at the recovery point and the images subsequent to the recovery point are encoded. Specifically, FIG. 9 shows the location of the refreshing operation in the encoding frame. The refreshing operation occurs before the loop filter module in the encoding loop. The refreshing operation may occur on the image level or the macro block level, but it occurs only after decoding of the current frame or macro block and before decoding of the next frame. The refreshing operation is put in an intra-frame predictive loop. Therefore, in the refreshing process, the current decoded block which has been refreshed affects the refreshing of the next decoded block (but does not affect encoding of the next block). It shall be noted that the refreshing process is relatively independent of the encoding process, and the reference buffer is overridden by the refreshing buffer only when the recovery point arrives.

Figure 10A:
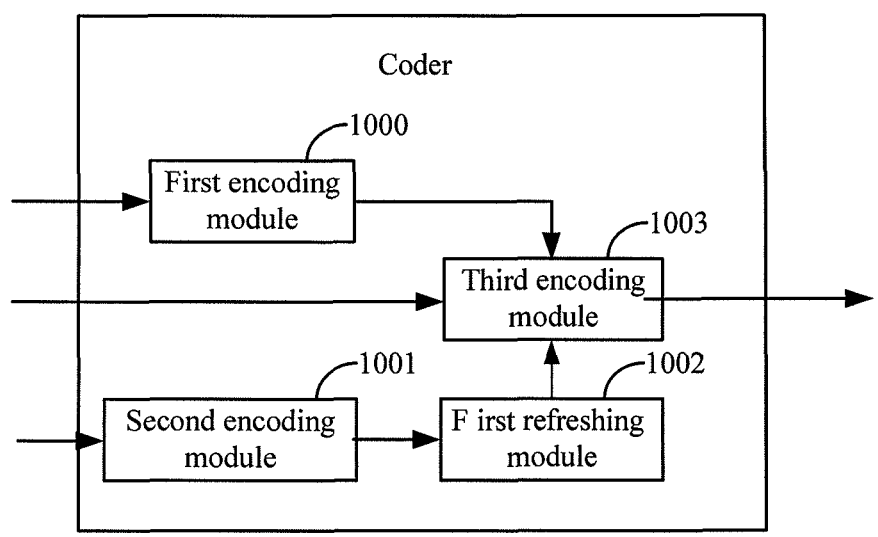
FIG. 10A illustrates a structure of an encoder according to an embodiment of the present disclosure.

As shown in FIG. 10A, the structure of an encoder provided in an embodiment of the present disclosure includes:

a first encoding module 1000, configured to encode an I-frame image to obtain a first reconstructed image, wherein the I-frame serves as a random access cut-in point;

a second encoding module 1001, configured to encode a reference image between the I-frame and a recovery point to obtain a second reconstructed image;

a first refreshing module 1002, configured to refresh the second reconstructed image to obtain the first refreshed image; and a third encoding module 1003, configured to encode the corresponding frame at the recovery point by using the first reconstructed image and/or the first refreshed image as reference image.

Figure 10B:
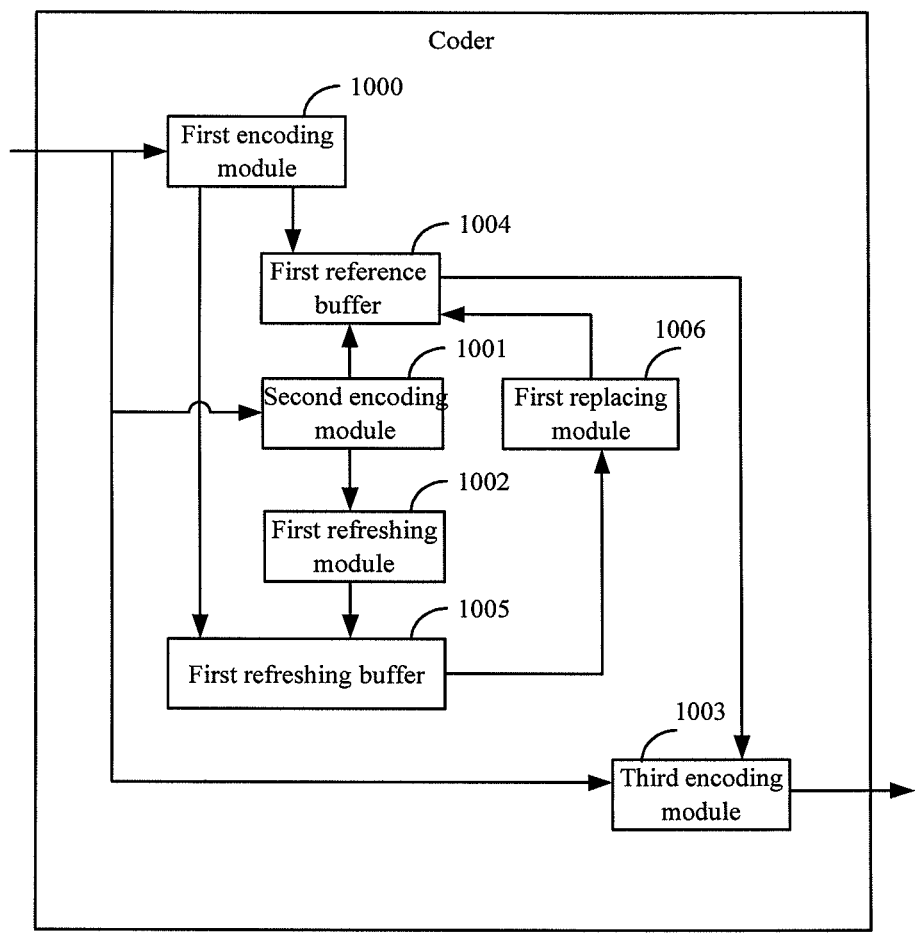
FIG. 10B illustrates a structure of an encoder according to another embodiment of the present disclosure.

As shown in FIG. 10B, the encoder shown in FIG. 10A may further include:

a first reference buffer 1004, configured to store the first reconstructed image and the second reconstructed image;

a first refreshing buffer 1005, configured to store the first reconstructed image and the first refreshed image; and a first replacing module 1006, configured to replace the image in the first reference buffer 1004 with the image in the first refreshing buffer 1005.

The first coding module 1000 is further configured to store the first reconstructed image into the first reference buffer 1004 and the first refreshing buffer 1005 after obtaining the first reconstructed image.

The second encoding module 1001 is further configured to store the second reconstructed image into the first reference buffer 1004 after obtaining the second reconstructed image.

The first refreshing module 1002 is further configured to store the first refreshed image into the first refreshing buffer 1005 after obtaining the first refreshed image.

The third encoding module 1003 is further configured to encode the corresponding frame at the recovery point by using the image in the first reference buffer 1004 as a reference image.

Figure 11:
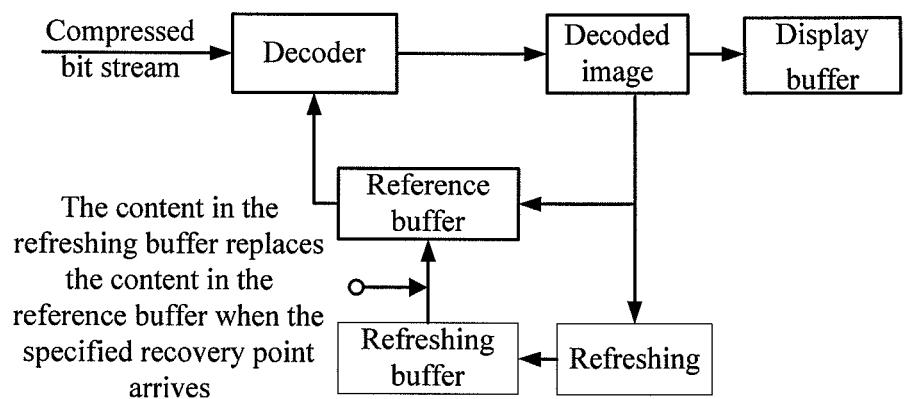
FIG. 11 illustrates buffer management related to a refreshing operation at the decoder according to an embodiment of the present disclosure.

Based on the same conception of the prevent disclosure, a decoder is provided herein. FIG. 11 shows the buffer management involved in the refreshing process. That is, a refreshing operation and a refreshing buffer are added at the decoder. Refreshing is required before the decoded image is stored into the reference buffer. Only the refreshed images generated after refreshing of the decoded images of the reference images (I, P) are stored into the refreshing buffer. When the specified recovery point arrives, the content in the refreshing buffer replaces the content in the reference buffer, and then the image at the recovery point and the images subsequent to the recovery point are decoded.

Figure 12A:
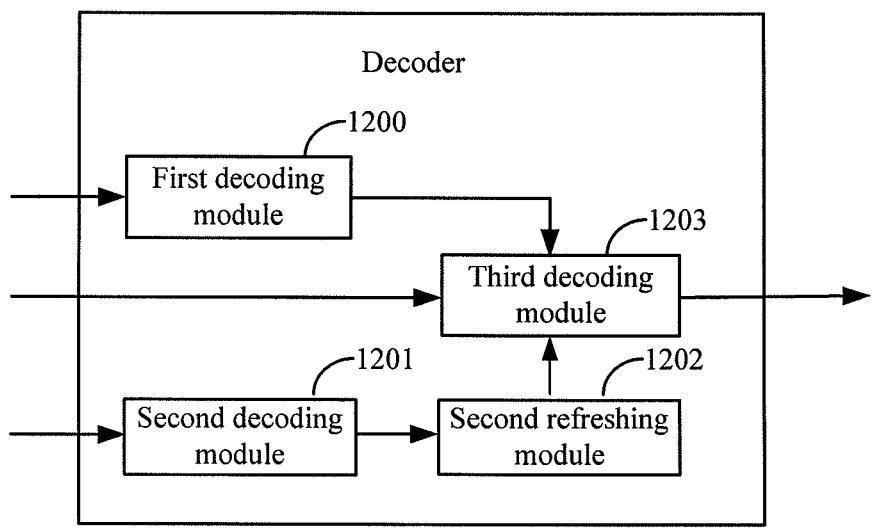
FIG. 12A illustrates a structure of a decoder according to an embodiment of the present disclosure.

As shown in FIG. 12A, the structure of a decoder provided in an embodiment of the present disclosure includes:

a first decoding module 1200, configured to decode an I-frame image to obtain a first decoded image, wherein the I-frame serves as a random access cut-in point;

a second decoding module 1201, configured to decode a reference image between the I-frame and a recovery point to obtain a second decoded image;

a second refreshing module 1202, configured to refresh the second decoded image to obtain a second refreshed image; and a third decoding module 1203, configured to decode the corresponding frame at the recovery point by using the first decoded image and/or the second refreshed image as reference image.

Figure 12B:
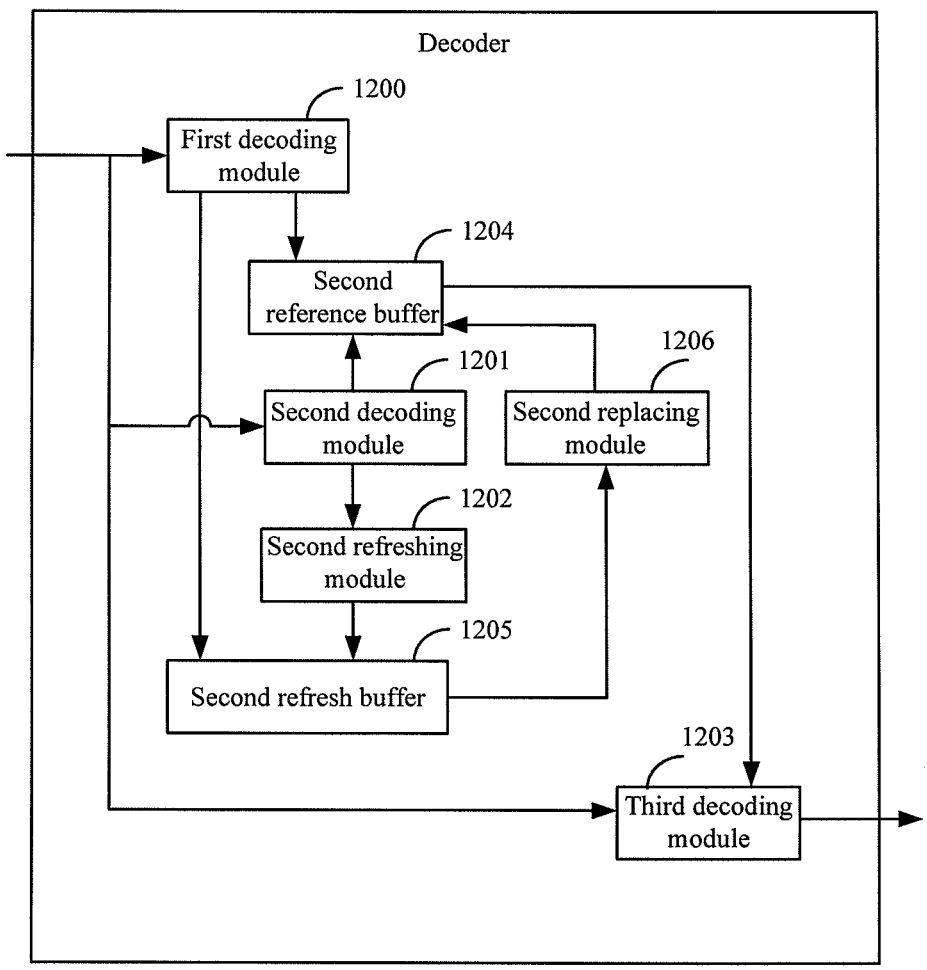
FIG. 12B illustrates a structure of a decoder according to another embodiment of the present disclosure.

As shown in FIG. 12B, the decoder shown in FIG. 12A may further include:

a second reference buffer 1204, configured to store the first decoded image and the second decoded image;

a second refreshing buffer 1205, configured to store the first decoded image and the second refreshed image; and a second replacing module 1206, configured to replace the image in the second reference buffer 1204 with the image in the second refreshing buffer 1205.

The first decoding module 1200 is further configured to store the first decoded image into the second reference buffer 1204 and the second refreshing buffer 1205 after obtaining the first decoded image.

The second decoding module 1201 is further configured to store the second decoded image into the second reference buffer 1204 after obtaining the second decoded image.

The second refreshing module 1202 is further configured to store the second refreshed image into the second refreshing buffer 1205 after obtaining the second refreshed image.

The third decoding module 1203 is further configured to decode the corresponding frame at the recovery point by using the image in the second reference buffer 1204 as a reference image.

Figure 13:
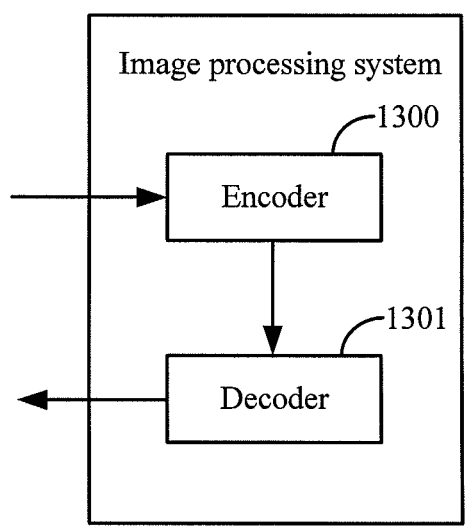
FIG. 13 illustrates a structure of an image processing system according to an embodiment of the present disclosure.

Based on the same conception of the present disclosure, an image processing system is provided in an embodiment of the present disclosure. As shown in FIG. 13, the structure the system includes an encoder 1300 and a decoder 1301.

The encoder 1300 is adapted to: encode an I-frame to obtain a first reconstructed image, wherein the I-frame serves as a random access cut-in point; encode a reference image between the I-frame and a recovery point to obtain a second reconstructed image; refresh the second reconstructed image to obtain a first refreshed image; and encode the corresponding frame at the recovery point by using the first reconstructed image and/or the first refreshed image as reference image.

The decoder 1301 is adapted to: decode an I-frame image to obtain a first decoded image, wherein the I-frame serves as a random access cut-in point; decode a reference image between the I-frame and a recovery point to obtain a second decoded image; refresh the second decoded image to obtain a second refreshed image; and decode the corresponding frame at the recovery point by using the first decoded image and/or the second refreshed image as reference image.

It is understandable to those skilled in the art that all or part of the steps in the above embodiments may be performed through hardware instructed by a program. The program may be stored in a computer-readable storage medium such as ROM/RAM, magnetic disk, and compact disk.

In the embodiments of the present disclosure, at the encoder, an I-frame is used as a random access cut-in point to encode the I-frame and obtain a first reconstructed image; a reference image between the I-frame and a recovery point is encoded to obtain a second reconstructed image; the second reconstructed image is refreshed to obtain a first refreshed image; and the first reconstructed image and the first refreshed image are used as reference images to encode the corresponding frame at the recovery point. Correspondingly at the decoder, the I-frame is used as a random access cut-in point to decode the I-frame and obtain a first decoded image; the reference image between the I-frame and the recovery point is decoded to obtain a second decoded image; the second decoded image is refreshed to obtain a second refreshed image; and the first decoded image and the second refreshed image are used as reference images to decode the corresponding frame at the recovery point. In the decoding process, the second decoded image is refreshed to obtain the second refreshed image, and is displayed as the second refreshed image. In this way, even if a reference frame is lost, the second refreshed image can always be obtained at the decoder. Therefore, random access can be performed by using each I-frame as a random access cut-in point in the case of multi-reference image random access, thus improving the flexibility of multi-reference image random access significantly. The random access and edit are allowed to occur at the GOP border rather than the sequence or IDR border. Random access is allowed to cut in from any I-frame even if multiple reference images exist. Random access, edit, splicing, fast-forward, and fast-backward may be performed at every I-frame of the compressed bit stream, without the need of locating the random access cut-in point.

Moreover, the method provided in the embodiments of the present disclosure makes the best of the multi-reference image technology, and keeps high coding efficiency. By using a refreshing technology at the encoder, it is not necessary to restrict the quantity or the predictive feature of the reference images at the encoder, thus accomplishing higher coding efficiency. The random access method based on the refreshing technology provides higher coding efficiency as against the random access method based on the existing standard. For example, in the H.264, the IDR serves as a random access cut-in point; in the AVS standard, the sequence header serves as a random access cut-in point. Both standards restrict the predictive feature of the reference image, and reduce the coding efficiency to some extent.

The method provided herein resists errors strongly, and prevents error spreading effectively. In the case of multi-reference images, the correct decoding may be recovered through the refreshing technology even if the reference image is lost.

In the embodiments of the present disclosure, the recovery point may be set flexibly to accomplish a tradeoff between the coding efficiency and the time required for fast recovery of correct decoding.

Through the embodiments of the present disclosure, the quality of the image near the random access cut-in point is improved, and the subjective experience of the user is enhanced. Through the refreshing technology, the image that lacks a reference image is refreshed, thus preventing the decoder from discarding the images unsuitable for decoding continuously. The refreshed images are available for display, thus enhancing the subjective experience of the user in the case of random access.

The method provided herein is compatible with the existing standards. On the one hand, the refreshed bit stream can be decoded by ordinary decoders; on the other hand, the refreshing technology may be applied as a post-processing technology, and quicken recovery of correct decoding of the decoder. In this case, it is not necessary for the refreshing technology to be supported by the encoder, and thus it needs no change of the existing standards.

It is apparent that those skilled in the art can make various modifications and variations to the present disclosure without departing from the spirit and scope of the present disclosure. The present disclosure is intended to cover such modifications and variations provided that they fall in the scope of protection defined by the following claims or their equivalents.

What is claimed is:

1. An encoding method, comprising:
   encoding an I-frame image to obtain a first reconstructed image; wherein the I-frame serves as a random access cut-in point;
   encoding an image between the I-frame image and a recovery point to obtain a second reconstructed image;
   refreshing the second reconstructed image to obtain a first refreshed image; wherein the first refreshed image is independent of the image content before the random access cut-in point; and
   encoding a corresponding image at the recovery point by using at least one of the first reconstructed image and the first refreshed image as a reference image;
   wherein the method further comprises:
   storing the first reconstructed image and the second reconstructed image into a first reference buffer;
   storing the first reconstructed image and the first refreshed image into a first refreshing buffer; and
   replacing the image in the first reference buffer with the image in the first refreshing buffer before encoding the corresponding image at the recovery point.

2. The method according to claim 1, wherein the refreshing includes any one or combination of the following technologies: replacement, motion vector scaling, intra-frame prediction compensation, and inter-frame prediction compensation.

3. The method according to claim 1, wherein the corresponding image at the recovery point is a P-frame image or an I-frame image.

4. The method according to claim 1, wherein the location of the recovery point is determined according to coding efficiency.

5. The method according to claim 1, wherein the recovery point and the corresponding random access cut-in point are located in the same Group Of Picture, GOP; or the recovery point and the random access cut-in point is located in different GOPs.

6. The method according to claim 1, wherein the step of refreshing the second reconstructed image to obtain a first refreshed image is performed before loop filtering.

7. A decoding method, comprising:
   decoding an I-frame image to obtain a first decoded image; wherein the I-frame serves as a random access cut-in point;
   decoding an image between the I-frame image and a recovery point to obtain a second decoded image;
   refreshing the second decoded image to obtain a second refreshed image; wherein the second refreshed image is independent of the image content before the random access cut-in point; wherein the refreshing applied corresponds to the encoding side so that the second refreshed image obtained at the decoding side is the same as the corresponding refreshed image obtained at the encoding side; and
   decoding a corresponding image at the recovery point by using at least one of the first decoded image and the second refreshed image as a reference image;
   wherein the method further comprises:
   storing the first decoded image and the second decoded image to a second reference buffer;
   storing the first decoded image and the second refreshed image in to a second refreshing buffer; and
   replacing the image in the second reference buffer with the image in the second refreshing buffer before decoding the corresponding image at the recovery point.

8. The method according to claim 7, wherein the refreshing includes any one or combination of the following technologies: replacement, motion vector scaling, intra-frame prediction compensation, and inter-frame prediction compensation.

9. The method according to claim 7, wherein the corresponding image at the recovery point is a P-frame image or an I-frame image.

10. The method according to claim 7, wherein the location of the recovery point is determined according to a predetermined protocol set by the encoder and the decoder, or the location of the recovery point is indicated to the decoding side by the encoding side.

11. The method according to claim 7, wherein the recovery point and random access cut-in point are located in the same Group Of Picture, GOP; or the recovery point and the random access cut-in point are located in different GOPs.

12. An encoder, comprising:
    a first encoding module, configured to encode an I-frame image to obtain a first reconstructed image; wherein the I-frame serves as a random access cut-in point;
    a second encoding module, configured to encode an image between the I-frame image and a recovery point to obtain a second reconstructed image;
    a first refreshing module, configured to refresh the second reconstructed image to obtain a first refreshed image; wherein the first refreshed image is independent of the image content before the random access cut-in point; and
    a third encoding module, configured to encode a corresponding image at the recovery point by using at least one of the first reconstructed image and the first refreshed image as a reference image;
    a first reference buffer, configured to store the first reconstructed image and the second reconstructed image;
    a first refreshing buffer, configured to store the first reconstructed image and the first refreshed image; and
    a first replacing module, configured to replace the image in the first reference buffer with the image in the first refreshing buffer;
    wherein
    the first encoding module is further configured to store the first reconstructed image into the first reference buffer and the first refreshing buffer after obtaining the first reconstructed image;
    the second encoding module is further configured to store the second reconstructed image into the first reference buffer after obtaining the second reconstructed image;
    the first refreshing module is further configured to store the first refreshed image into the first refreshing buffer after obtaining the first refreshed image; and
    the third encoding module is further configured to encode the corresponding frame at the recovery point by using the image in the first reference buffer as the reference image.

13. The encoder according to claim 12, wherein the recovery point and the corresponding random access cut-in point are located in the same Group Of Picture, GOP; or the recovery point and the random access cut-in point are located in different GOPs.

14. A decoder, comprising:
a first decoding module, configured to decode an I-frame image to obtain a first decoded image; wherein the I-frame serves as a random access cut-in point;
a second decoding module, configured to decode an image between the I-frame image and a recovery point to obtain a second decoded image;
a second refreshing module, configured to refresh the second decoded image to obtain a second refreshed image; wherein the second refreshed image is independent of the image content before the random access cut-in point; wherein the refreshing applied corresponds to the encoding side so that the second refreshed image obtained at the decoding side is the same as the corresponding refreshed image obtained at the encoding side; and
a third decoding module, configured to decode the corresponding image at the recovery point by using at least one of the first decoded image and the second refreshed image as a reference image;
a second reference buffer, configured to store the first decoded image and the second decoded image;
a second refreshing buffer, configured to store the first decoded image and the second refreshed image; and
a second replacing module, configured to replace the image in the second reference buffer with the image in the second refreshing buffer;
wherein
the first decoding module is further configured to store the first decoded image into the second reference buffer and the second refreshing buffer after obtaining the first decoded image;
the second decoding module is further configured to store the second decoded image into the second reference buffer after obtaining the second decoded image;
the second refreshing module is further configured to store the second refreshed image into the second refreshing buffer after obtaining the second refreshed image; and
the third decoding module is further configured to decode the corresponding frame at the recovery point by using the image in the second reference buffer as the reference image.

15. A non-transitory computer readable medium, comprising computer program codes stored thereon, executable by one or more digital processor, wherein the computer program codes comprise:
instructions for decoding an I-frame image to obtain a first decoded image; wherein the I-frame serves as a random access cut-in point;
instructions for decoding an image between the I-frame image and a recovery point to obtain a second decoded image;
instructions for refreshing the second decoded image to obtain a second refreshed image; wherein the second refreshed image is independent of the image content before the random access cut-in point; wherein the refreshing applied corresponds to the encoding side so that the second refreshed image obtained at the decoding side is the same as the corresponding refreshed image obtained at the encoding side; and
instructions for decoding a corresponding image at the recovery point by using at least one of the first decoded image and the second refreshed image as a reference image;
instructions for storing the first decoded image and the second decoded image to a second reference buffer;
instructions for storing the first decoded image and the second refreshed image in to a second refreshing buffer; and
instructions for replacing the image in the second reference buffer with the image in the second refreshing buffer before decoding the corresponding image at the recovery point.

* * * * *